United States Patent
Rudduck et al.

(10) Patent No.: US 8,066,462 B2
(45) Date of Patent: Nov. 29, 2011

(54) DEVELOPMENT IN BEAM TYPE FASTENERS

(75) Inventors: Dickory Rudduck, Chicago, IL (US); Lee David Blattmann, Castle Cove (AU)

(73) Assignee: Telezygology, Inc., Chicago, IL (US)

( * ) Notice: Subject to any disclaimer, the term of this patent is extended or adjusted under 35 U.S.C. 154(b) by 354 days.

(21) Appl. No.: 12/097,090

(22) PCT Filed: Dec. 12, 2006

(86) PCT No.: PCT/AU2006/001874
§ 371 (c)(1),
(2), (4) Date: Nov. 25, 2008

(87) PCT Pub. No.: WO2007/068035
PCT Pub. Date: Jun. 21, 2007

(65) Prior Publication Data
US 2009/0214320 A1     Aug. 27, 2009

(30) Foreign Application Priority Data
Dec. 12, 2005 (AU) .............................. 2005906986

(51) Int. Cl.
*F16B 19/00* (2006.01)
(52) U.S. Cl. ....................................... 411/360; 411/909
(58) Field of Classification Search ................. 411/360, 411/909; 292/DIG. 66, DIG. 69, 121, 122, 292/253; 60/528
See application file for complete search history.

(56) References Cited

U.S. PATENT DOCUMENTS

| | | | |
|---|---|---|---|
| 3,203,166 A * | 8/1965 | Flanagan ........................ | 60/528 |
| 4,551,975 A * | 11/1985 | Yamamoto et al. ............. | 60/528 |
| 5,335,498 A * | 8/1994 | Komatsu et al. ................ | 60/528 |
| 5,619,177 A * | 4/1997 | Johnson et al. ................ | 337/140 |
| 5,727,391 A * | 3/1998 | Hayward et al. ................ | 60/528 |
| 6,161,382 A * | 12/2000 | Brotz ............................... | 60/528 |
| 6,352,337 B1 * | 3/2002 | Sharma .......................... | 347/56 |
| 6,882,264 B2 * | 4/2005 | Cunningham ................ | 337/139 |
| 2004/0104580 A1 * | 6/2004 | Spiessl et al. .................. | 292/84 |

FOREIGN PATENT DOCUMENTS

| | | |
|---|---|---|
| JP | 2001015956 | 1/2001 |
| WO | 2004/001235 | 12/2003 |
| WO | 2004/101922 | 2/2004 |
| WO | 2005/073566 | 8/2005 |

\* cited by examiner

*Primary Examiner* — Gary Estremsky
(74) *Attorney, Agent, or Firm* — Heather A. Kartsounes

(57) ABSTRACT

The invention provides a fastener (10) which has an actuating means (12), a bias means (14) and a flexible core (16). The flexible core (16) has an means for engaging (18) which may be integral with but is preferable separate from the flexible core (16)

The actuating means (12) includes a material adapted to contract when activated, such as shape memory alloy. Upon contraction of this material, the means for engaging (18) is movable between an engagement position and a disengagement position. The bias means (14) biases the flexible core (16) to the engagement position.

10 Claims, 14 Drawing Sheets

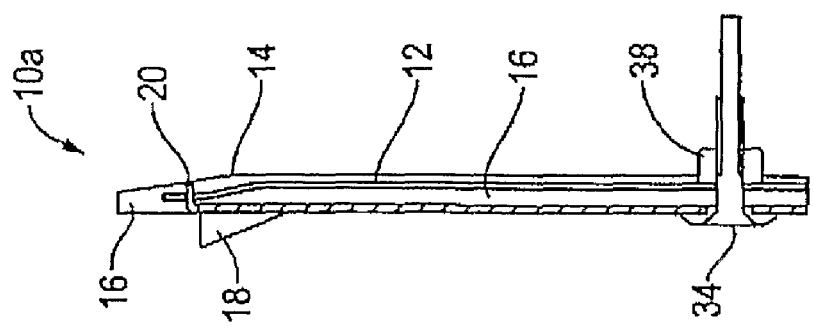
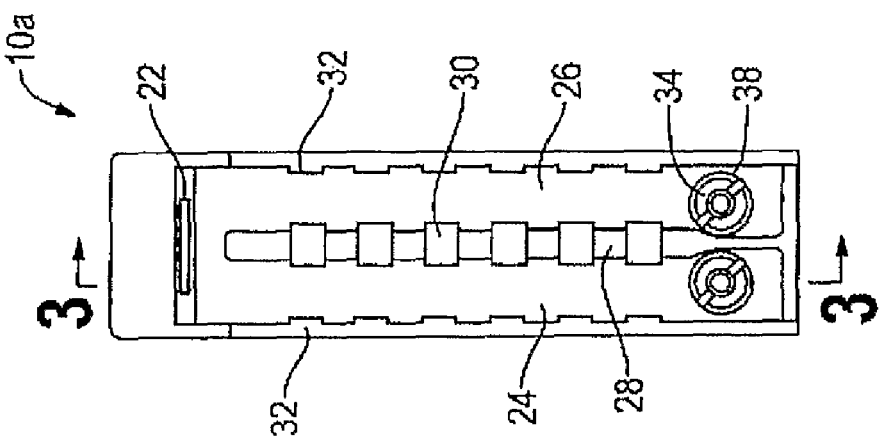
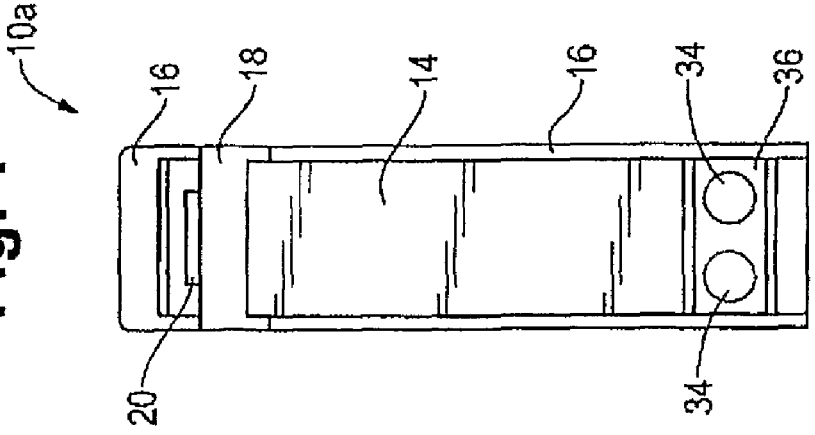

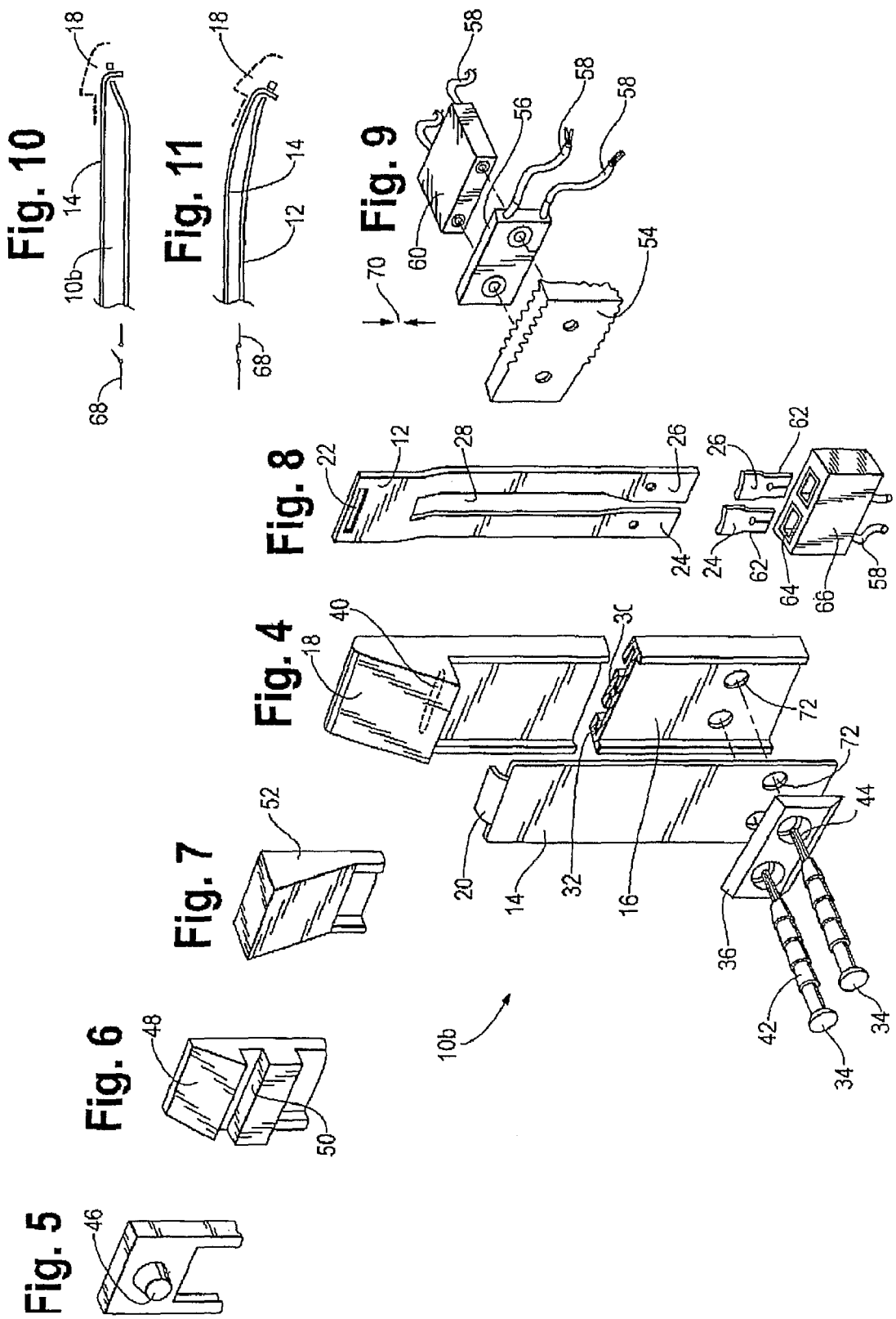

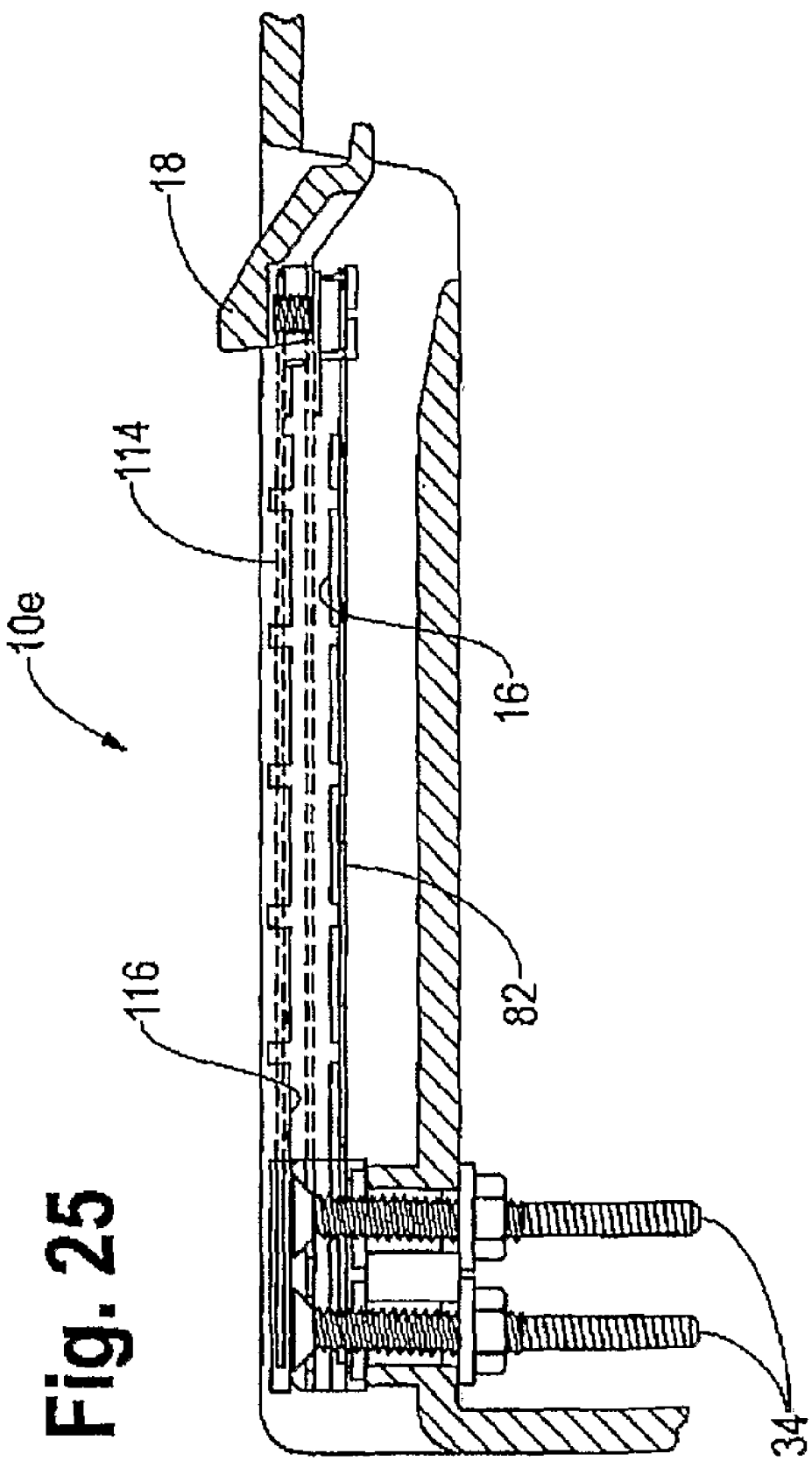

DEVELOPMENT IN BEAM TYPE FASTENERS

FIELD OF THE INVENTION

This invention is concerned with developments in beam-type fasteners.

Beam-type fasteners were disclosed in International Patent Application No PCT/AU03/000759 (referred to below as the "International Application"). The contents of the International Application are incorporated herein by reference.

It will be appreciated by one skilled in the art that a substantial part of the disclosure in the International Application will also be applicable to the invention disclosed below.

BACKGROUND OF THE INVENTION

The beam-type fastener disclosed in the International Application includes a fastening element having a flexible beam and an means for engaging, and actuating means which is attached to the fastening element and which includes a material adapted to contract when activated. The beam is movable, upon contraction of the material, between an engagement position and a disengagement position.

The material adapted to contract when activated is preferably a shape memory alloy material, such as those readily available and known.

DISCLOSURE OF THE INVENTION

The present invention provides a fastener including:
(a) actuating means including a material adapted to contract when activated;
(b) bias means; and
(c) a flexible core located between the actuating means and the bias means, the flexible core having an means for engaging;
wherein the means for engaging is movable, upon contraction of the material, between an engagement position and a disengagement position, and wherein the bias means biases the flexible core to the engagement position.

Preferably, the flexible core substantially insulates the actuating means from the bias means.

It is preferred that the flexible core is made of a suitable plastic material and that the bias means is a steel leaf spring. The invention is not limited to these embodiments, however.

The flexible core may resemble to some extent the flexible beam of the International Application. However, it will be appreciated by one skilled in the art that the flexible core need not have the degree of structural strength incorporated in the flexible beam, because of the bias provided by the bias means. Consequently, although the fastener of the present invention may be regarded as a development in the beam-type fastener of the International Application, there are preferred differences between the beam of the fastener of the International Application and the core of the fastener of the present invention.

In one embodiment, the actuating means is a punched shape memory alloy profile. Examples are shown in the drawings. In another embodiment, the actuating means includes or comprises one or more strands or wires. The drawings show the embodiment where the actuating means is a "U" shaped wire and another embodiment where the actuating means takes the form of shape memory alloy wire which is returned one or more times to provide increased pulling power. It is also within the scope of the invention that the actuating means may take the form of multiple strands of wire. The actuating means may be of a different construction to those shown in the drawings.

The means for engaging may take any suitable form. For example, the means for engaging may take the form of a projecting wedge which can key into a corresponding recess in a wall of an element or which can otherwise retain an element in the desired configuration. Other forms of the means for engaging are within the scope of the invention. For example, the means for engaging may be a peg, may include a groove or may take the form of the disclosures in the International Application. Other configurations are possible.

The means for engaging is preferably separate from, rather than integral with, the flexible core. This feature may be used to enable easy substitution of different forms of means for engaging for different connecting situations.

When the means for engaging is moved from the engagement position to the disengagement position, it may be moved in any suitable manner. For example, if the means for engaging is located at one end of the core, movement of the means for engaging from the engagement position to the disengagement position may describe an arc. As another example, contraction of the actuating means may cause the means for engaging (and the core) to be moved axially, so that the means for engaging moves out of engagement with any element which it would otherwise fasten.

Preferably, the actuating means consists of or comprises shape memory alloy which contracts when activated by the application of an electrical current, to raise the temperature of the shape memory alloy to the appropriate temperature. For this purpose, the shape memory alloy material may be connected electrically in any suitable manner. It may be convenient to include a suitable microprocessor in any electrical connector, for operation of the fastener.

If desired, the fastener of the invention may include means to insulate the fastener, or part of it, thermally. As an example, a suitable piece of insulation, or insulating layer, may be applied to the actuating means or to another appropriate part of the fastener, to help control heat applied to the shape memory alloy.

The fastener of the invention may include other features, such as an overtemperature failsafe mechanism. By way of example, the fastener may include a second actuating means including a material adapted to contract when activated. In this embodiment, the second actuating means is designed to lock the fastener in the locked position once a particular temperature has been reached, such as 70° Celsius. The first actuating means in this case needs to be sufficiently strong to overcome the locking effect derived from the second actuating means, so that, when it is desired to disengage the fastener, the first actuating means is capable of causing disengagement, despite the locking effect of the second actuating means.

It is also within the scope of the invention that the fastener, or part of it, can form part of a circuit which can indicate whether the fastener is in the engagement position or in the disengagement position. As an example, the bias means when in the preferred embodiment of a spring steel leaf may be designed to contact a conductive material on an element which the fastener is intended to fasten. When the leaf is in electrical contact with the conductive material, a circuit can be completed. An enquiry can be made by applying current to the fastener, so that if the leaf is in electrical contact with the conductive material, a report can be sent that the fastener is in the engagement position. Conversely, if the circuit cannot be completed because the leaf is not in contact with the conductive material, the report will be that the fastener is in the disengagement position.

Rather that making an enquiry as to engagement or disengagement, a current may be applied continually to the fastener for a constant indication of the engagement or disengagement of the fastener.

If two or more fasteners of the invention are used in this environment, it may be possible to report on whether some or all of the fasteners are in the engaged or disengaged position.

The fastener of the invention, used singularly or as a plurality, may be controlled through a network, such as a controller area network (CAN). Through this control, individual fasteners may be addressed (each fastener including an appropriate address means) and be engaged or disengaged in a desired sequence.

A fastener of the invention may also be used to indicate tampering. If a fastener of the invention were to be used to fasten, for example, a global positioning by satellite (GPS) instrument, and the fastener was to be forced rather than to be disengaged in an authorised way, the breach of connection to the fastener may be designed to prevent the instrument from operating outside its environment. This feature may be used to deter theft.

BRIEF DESCRIPTION OF THE DRAWINGS

The invention will now be described in connection with certain non-limiting embodiments, in relation to the attached drawings.

In the drawings:

FIG. 1 is a front elevation of a first embodiment of fastener according to the invention;

FIG. 2 is a rear elevation of the same embodiment;

FIG. 3 is a sectional view taken along the line A-A of FIG. 2;

FIG. 4 is an exploded view of a second embodiment of the invention, similar in many respects to that of FIGS. 1 to 3;

FIGS. 5, 6 and 7 show embodiments of means for engaging;

FIGS. 8 and 9 show different embodiments of electrical connectors;

FIG. 10 shows in side view the fastener of FIG. 4 in the engagement position;

FIG. 11 shows the same embodiment in the disengagement position;

FIG. 25 is a side elevation of a fifth embodiment of the invention, including an overtemperature failsafe mechanism.

DETAILED DESCRIPTION OF THE DRAWINGS

Figure 12:
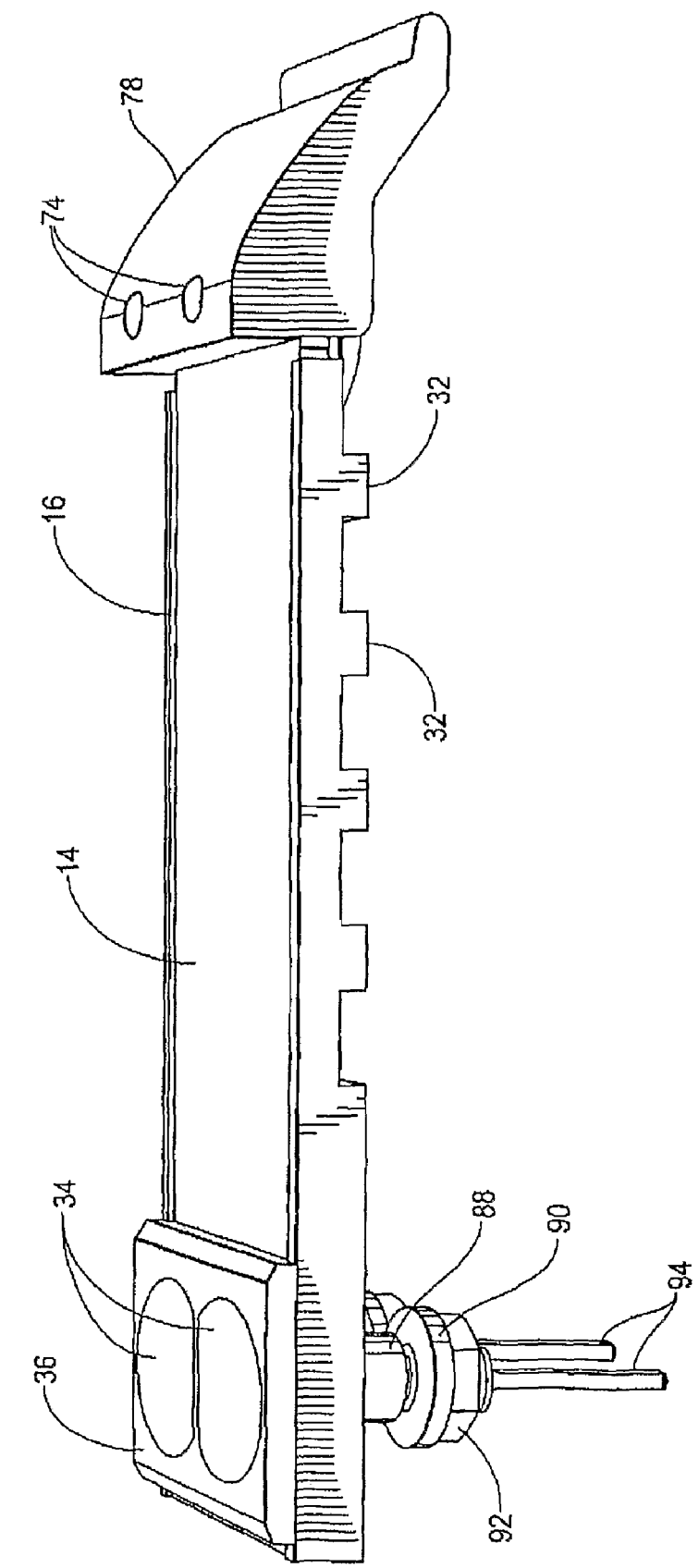
FIG. 12 is a side perspective view of a third embodiment of the invention.

Referring first to FIGS. 1 to 3, fastener 10*a* is shown having actuating means 12 made of shape memory alloy (SMA) material as a punched profile. Bias means 14, a thin (less than 0.5 mm) punched electroplated spring steel leaf, is located on one side of flexible core 16, while SMA profile 12 is located on the other side. This arrangement forms a sandwich, with SMA profile 12 being separated from leaf spring 14 by core 16.

Flexible core 16 is a 1 mm plastic moulding, produced by injection moulding and being made of 10% glass filled Nylon. Core 16 has, at one end, means for engaging 18. As can be seen in FIG. 3, means for engaging 18 is in the form of a projecting wedge, which can key into or retain an element (not shown).

Wedge 18 is movable, upon contraction of the SMA profile 12, between an engagement position and a disengagement position. Leaf spring 14 biases the wedge 18 to a default engagement position, which is that shown in FIGS. 1 to 3 for this embodiment.

SMA profile 12 is shown in FIG. 2 as having two legs 24 and 26, forming gap 28 between them. Core 16 includes six moulded projections 30 and a six pairs of extensions 32, in both cases to secure profile 12 to core 16. Projections 30 and extensions 32 can permit profile 12 to slide relative to core 16 should contraction of profile 12 occur axially, as discussed further below.

Leaf spring 14 includes tang 20 which fits through an aperture (not visible in these Figures) in core 16 and into a complementary slot 22 in SMA profile 12.

Two gold flashed brass mounting pins 34 pass through each of leaf spring 14, core 16 and SMA profile 12. Each pin 34 may be suitably insulated electrically from leaf spring 14, for example, by plastic clamping plate 36 (refer FIG. 1). Each pin 34 is connected electrically with SMA profile 12 by pressed gold flashed brass circular sleeves 38.

As a result of the mating of tang 20 with slot 22 (sandwiching core 16), the mating of projections 30 and extensions 32 with legs 24 and 26, and the insertion of pins 34 through the assembly, fastener 10*a* is held firmly together.

Pins 34 are connected to a suitable ASIC based controller PWA (not shown). On actuation, SMA profile 12 contracts and draws fastener 10*a* (and wedge 18) to the right, referring to FIG. 3. Thus wedge 18 can be drawn out of engagement with an element which it is designed to fasten. On release and cooling, leaf spring 14 rebiases SMA profile 12 and forces fastener 10*a* back to the engagement position.

If each of legs 24 and 26 measures about 4.0×0.2 mm, SMA profile 12 can have an equivalent strength of about fifty strands of 8/thousandth of an inch SMA wire. At 180 Mpa, SMA profile 12 can provide approximately 294 N of pulling force.

Reference is now made to the embodiments in FIGS. 4 to 11. In describing these Figures the same reference numerals will be used for the same or similar parts.

In FIG. 4, and similarly to FIGS. 1 to 3, fastener 10b has SMA profile 12, leaf spring 14 and core 16. SMA profile 12 has two legs 24 and 26, forming gap 28 between them. Leaf spring 14 includes tang 20 which fits through aperture 40 in core 16 and into a complementary slot 22 in SMA profile 12.

Part of core 16 is shown in cut away form so that projections 30 and extensions 32 can be seen.

Instead of wedge 18, core 16 may have other forms of means for engaging, such as peg 46 (FIG. 5), ramp 48 and groove 50 (FIG. 6) or "reverse wedge" 52. These are some of many types of means for engaging which may be suitable.

Mounting pins 34 in this embodiment include barbs 42 (only some of which are labelled) as well as electrical terminals 44. Barbs 42 help to secure the components of fastener 10. Mounting pins 34 pass through clamping plate 36, leaf spring 14, core 16 and SMA profile 12, before entering mount 54 to connect to electrical connector 56.

Connector 56 is shown with side cabling 58. An alternate style of electrical connector is shown in FIG. 9, where connector 60 has cabling 58 at the rear.

Yet another arrangement is shown in FIG. 8, where each leg 24 and 26 of SMA profile 12 has a tapered foot 62, designed to fit into slots 64 in connector 66, which has cabling 58 at the base.

Turning now to FIG. 10, in this embodiment electrical circuit 68 is off, so that fastener 10b is in the default position (engaged). Wedge 18 (shown partially and in dotted outline) is engaging an element (not shown). When circuit 68 is on, as in FIG. 11, SMA profile 12 contracts and draws wedge 18 from the engagement position in FIG. 10 to the disengagement position in FIG. 11, the movement of wedge 18 describing an arc.

In FIG. 10, leaf spring 14 is designed so that at rest, in the engagement position, fastener 10b is generally flat. Fastener 10b is curved towards a concave configuration as in FIG. 11 when SMA profile 12 is activated. It is within the scope of the invention that leaf spring 14 causes fastener 10 to adopt a convex configuration when at rest (engagement position) and is pulled to a generally flat configuration when SMA profile 12 is activated.

It is also within the scope of the invention that contraction of SMA profile 12 after activation occurs axially, rather than causing fastener 10b to curl back, as in FIG. 11, or to move from a convex configuration to a flat configuration, as described above. In axial contraction, SMA profile 12 would shorten, so that, referring to FIG. 4, shrinkage would occur in the dimension represented by arrows 70. Because of engagement of tang 20 through aperture 40 into slot 22, core 16 and leaf spring 14 would be forced to move downwardly towards mounting pins 34. (Apertures 72 in core 16 and leaf spring 14, of which only two are labelled, would need to be elongated for this purpose.) Wedge 18 would move downwardly with reference to FIG. 4, out of engagement with an element it was engaging.

Referring now to the third embodiment in FIGS. 12 to 18, as before, in describing these Figures, the same reference numerals will be used for the same or similar parts.

In FIGS. 12 to 18, fastener 10c has leaf spring 14 and a core represented by plastic spine 16. However, in this embodiment, instead of SMA profile 12, fastener 10c has SMA wire 82 (refer FIGS. 16, 17 and 18). In this embodiment, SMA wire forms a "U" shape and is 0.020 inch wire, which can provide a nominal combined force of 72.24N. Leaf spring 14 preferably has a thickness of 0.012 inch or 0.015 inch.

Figure 13:
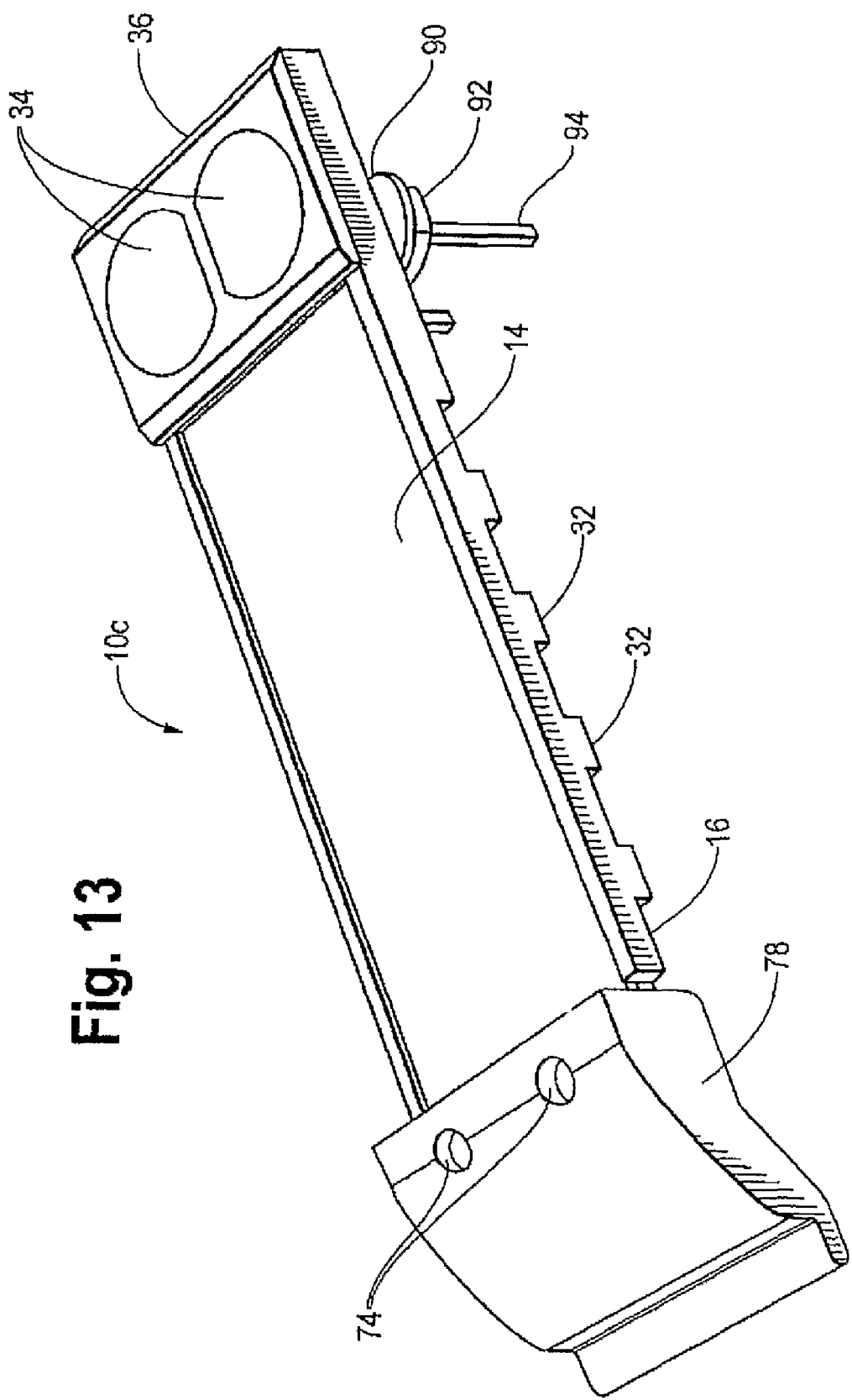
FIG. 13 shows the embodiment of FIG. 12 in perspective view from above.
Figure 14:
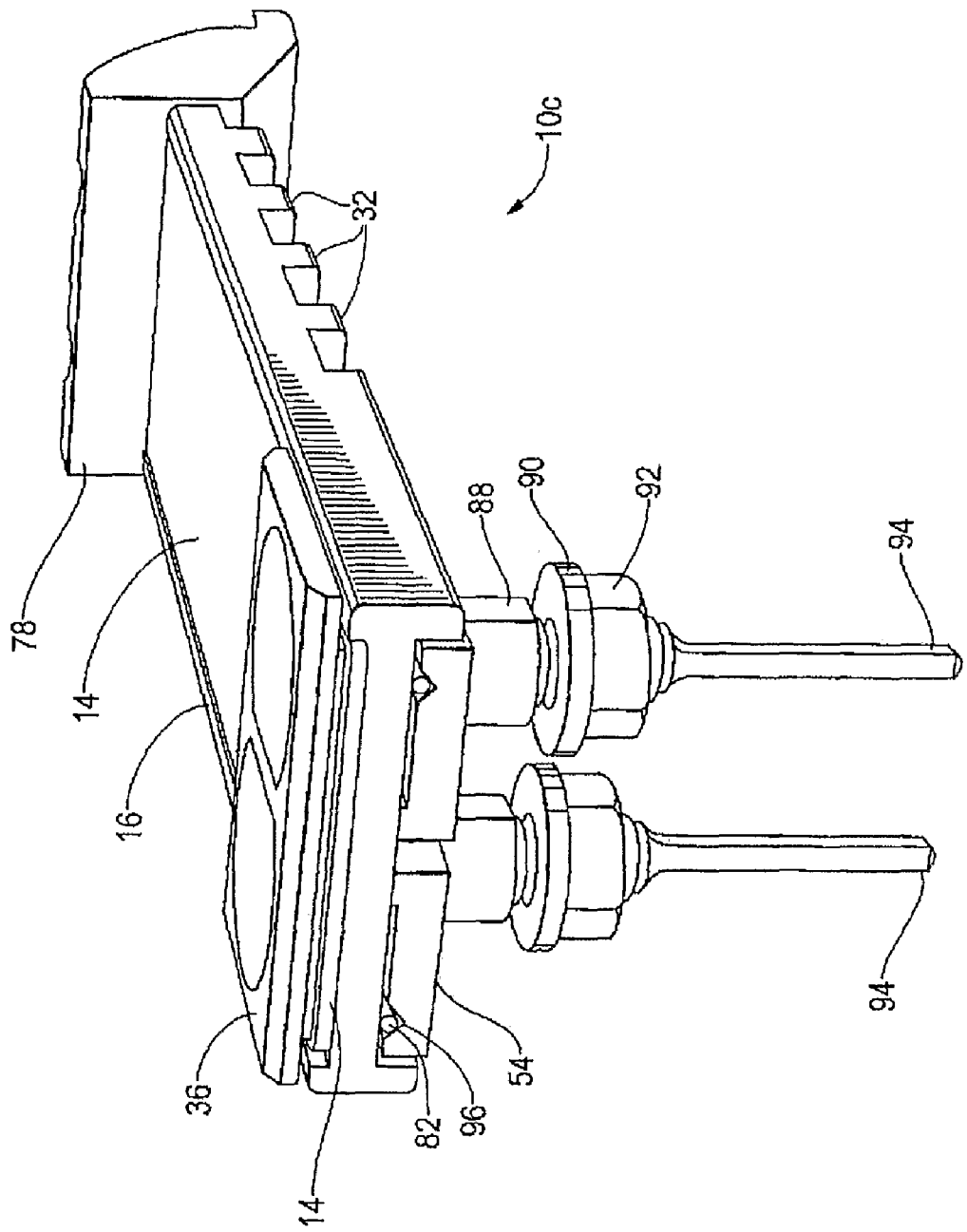
FIG. 14 shows the embodiment of FIG. 12 in perspective view from an end.
Figure 15:
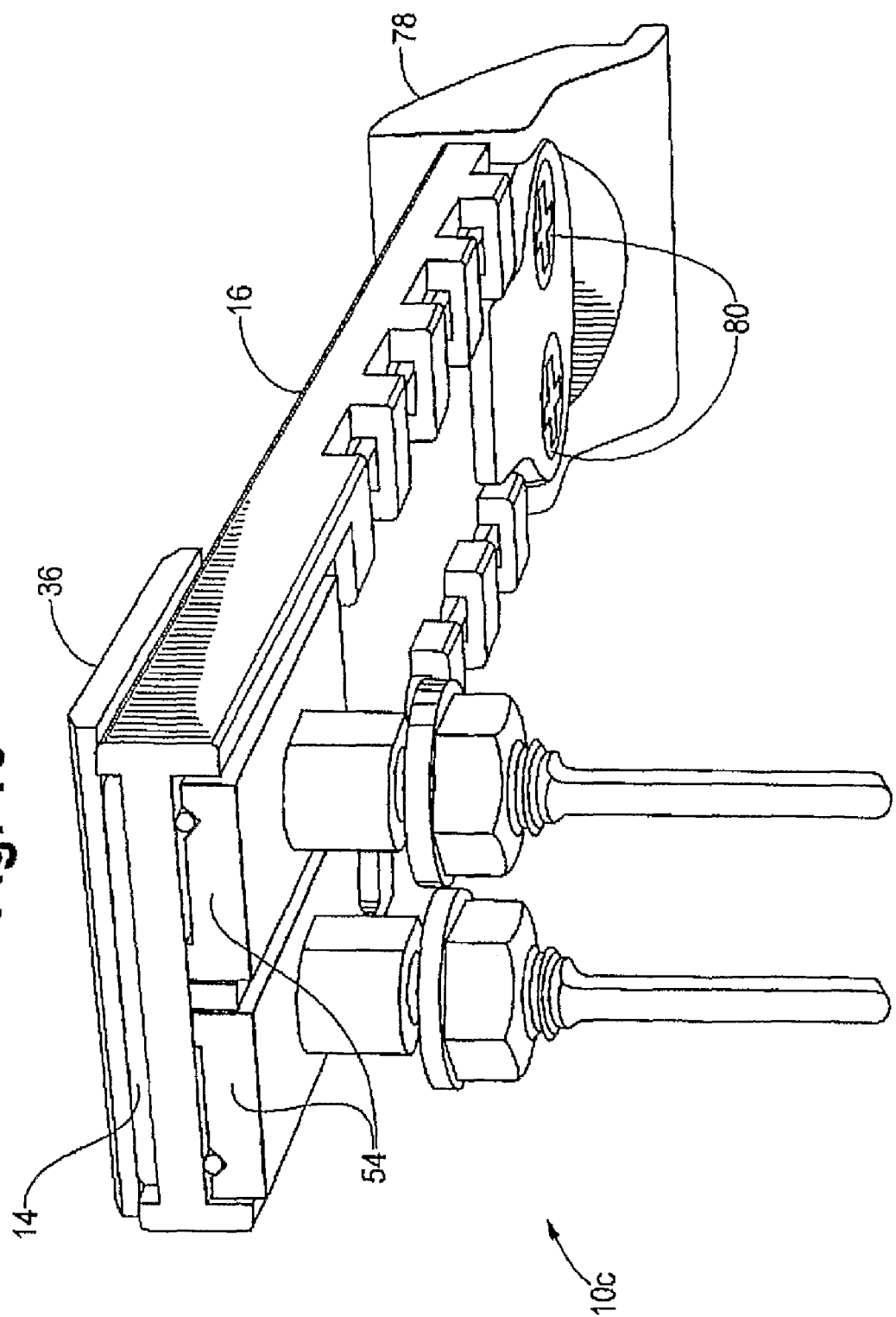
FIG. 15 is a similar view to that of FIG. 14 but showing the third embodiment in end perspective view from below.
Figure 17:
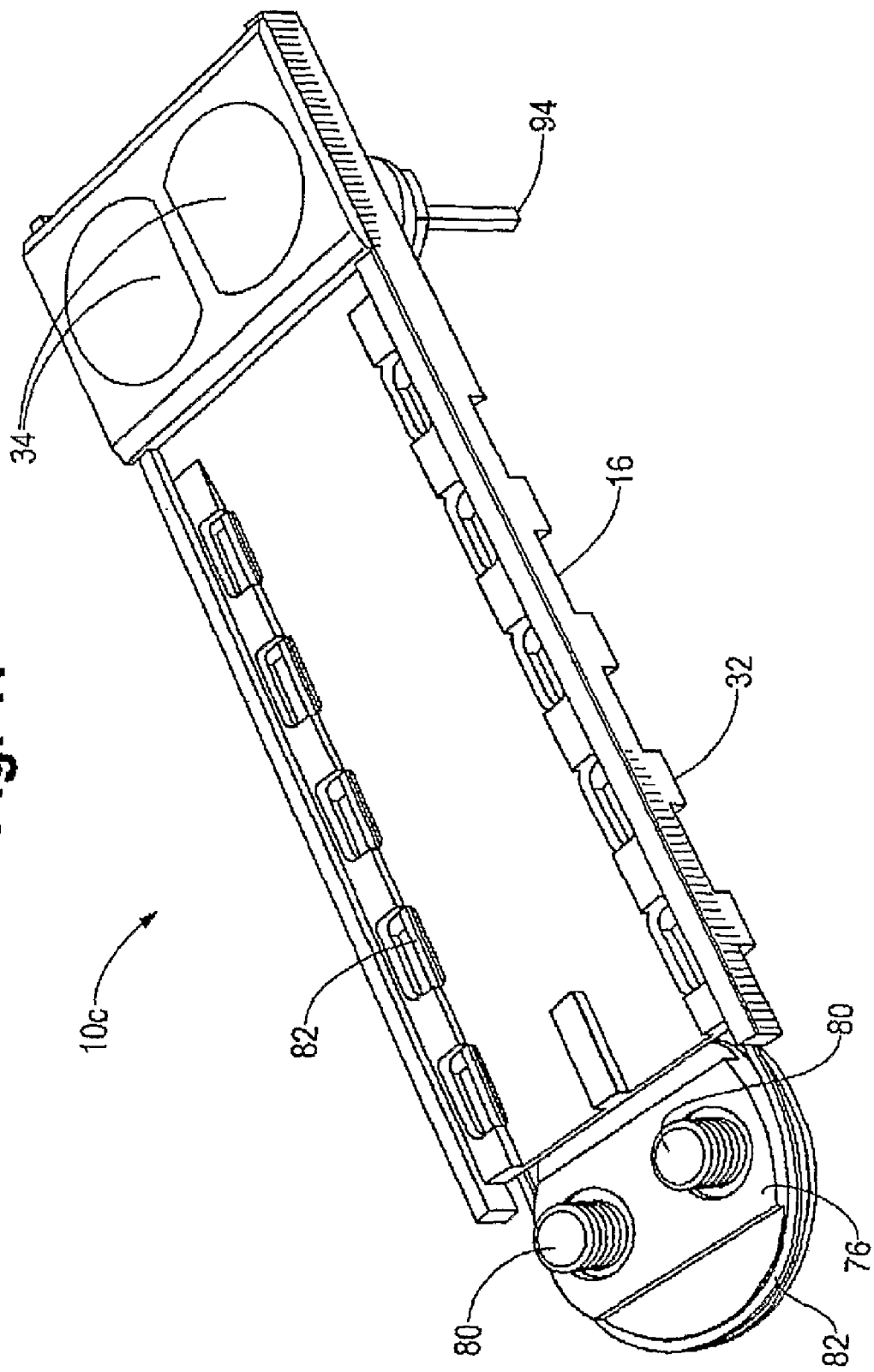
FIG. 17 shows the third embodiment in perspective view from above, similar to FIG. 13, but with part of the fastener cut away to show detail.
Figure 18:
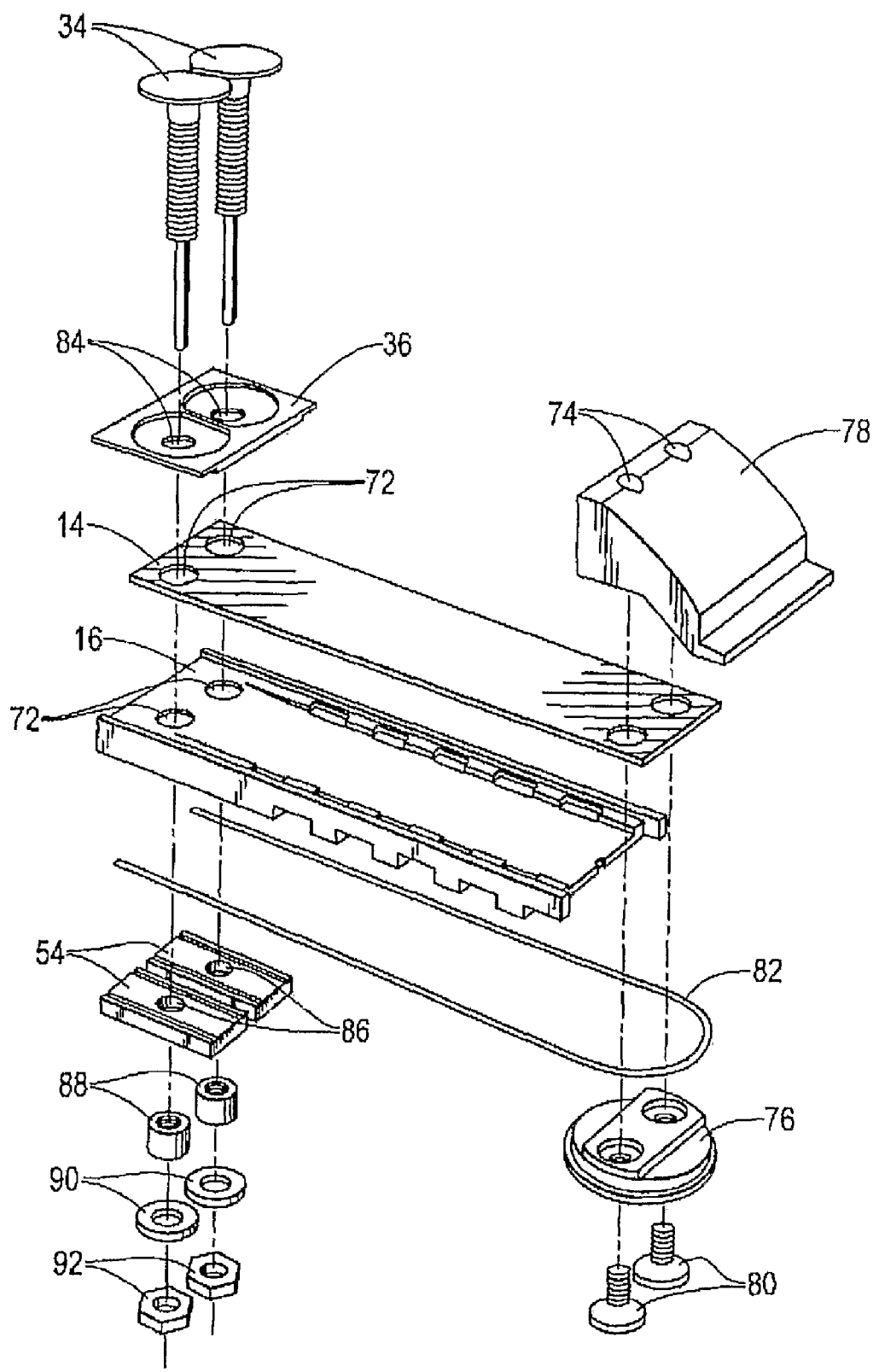
FIG. 18 is an exploded view of the third embodiment shown in FIGS. 12 to 17.

In this embodiment, means for engaging 78 takes the form of a 5.00 mm post clip having a pair of apertures 74, shown in FIGS. 12, 13 and 18. Apertures 74 are for the purpose of attaching means for engaging 78 to leaf spring 14 and spindle 76 by spindle screws 80. Spindle 76, preferable of injection moulded plastic and being of the same material as core 16, can be seen in FIGS. 16, 17 and 18.

Figure 16:
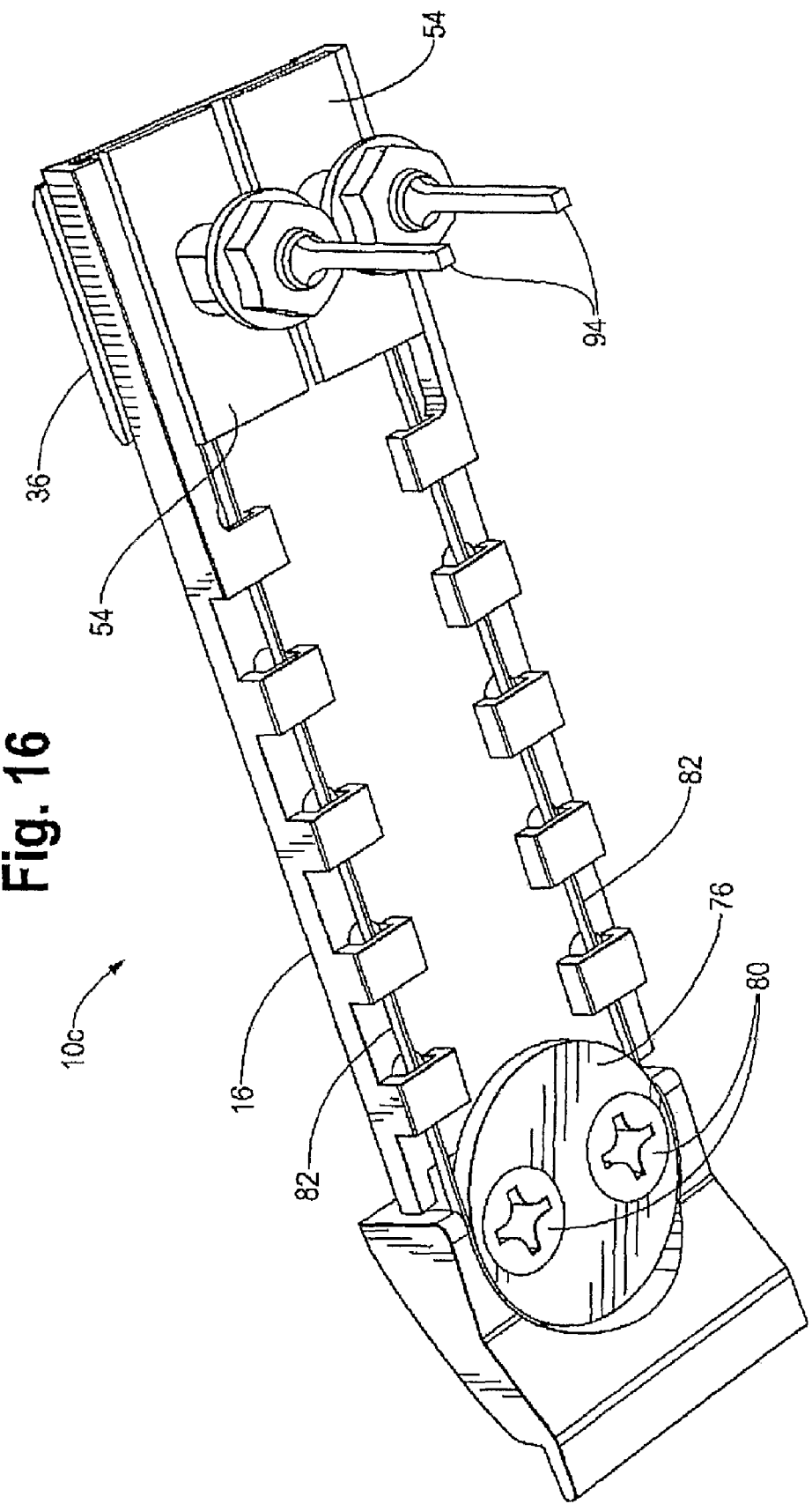
FIG. 16 shows the third embodiment in perspective view from below.

Spindle 76 is also used in relation to SMA wire 82, as best seen in FIGS. 16 and 17, to provide easy equalisation during contraction of SMA wire 82.

Flexible core/plastic spine 16 includes extensions 32 which in this embodiment assist to capture and substantially protect SMA wire 82.

Plastic clamping plate 36 has apertures 84 for receiving mounting or contact pins 34. Leaf spring 14 includes apertures 72 which correspond to apertures 72 in core 16.

Fastener 10c also includes a pair of clamp plates or mounts 54 having apertures 86. Contact pins 34 pass through apertures 84 in plate 36, apertures 72 in leaf spring 14, apertures 72 in core 16 and apertures 86 in plates 54. Barrel nuts 88, washers 90 and nuts 92 are then used to secure contact pins 34 to the assembly.

In this embodiment, contact pins 34 have a fixed orientation for easy assembly and alignment of the 0.64×0.64 mm square pin ends 94. Contact pins 34 have a pitch of 5.08 mm, set up to fit a standard style connector (not shown) to the pin ends.

Clamp plates 54 include channels 96 to accommodate SMA wire 82. If it is desired to change the size of SMA wire 82, for example from 0.020 inch to 0.015 inch, only minor changes would need to be made to clamp plates 54 and the size of channels 96. SMA wire of 0.015 inch could provide a nominal combined pull force of 40N.

When the third embodiment is provided in the dimensions indicated above, means for engaging 78 can have an "overhang" of 2.5 mm.

It will be appreciated that this third embodiment, in particular, has minimal parts and can easily be adapted to high volume manufacturing.

Figure 19:
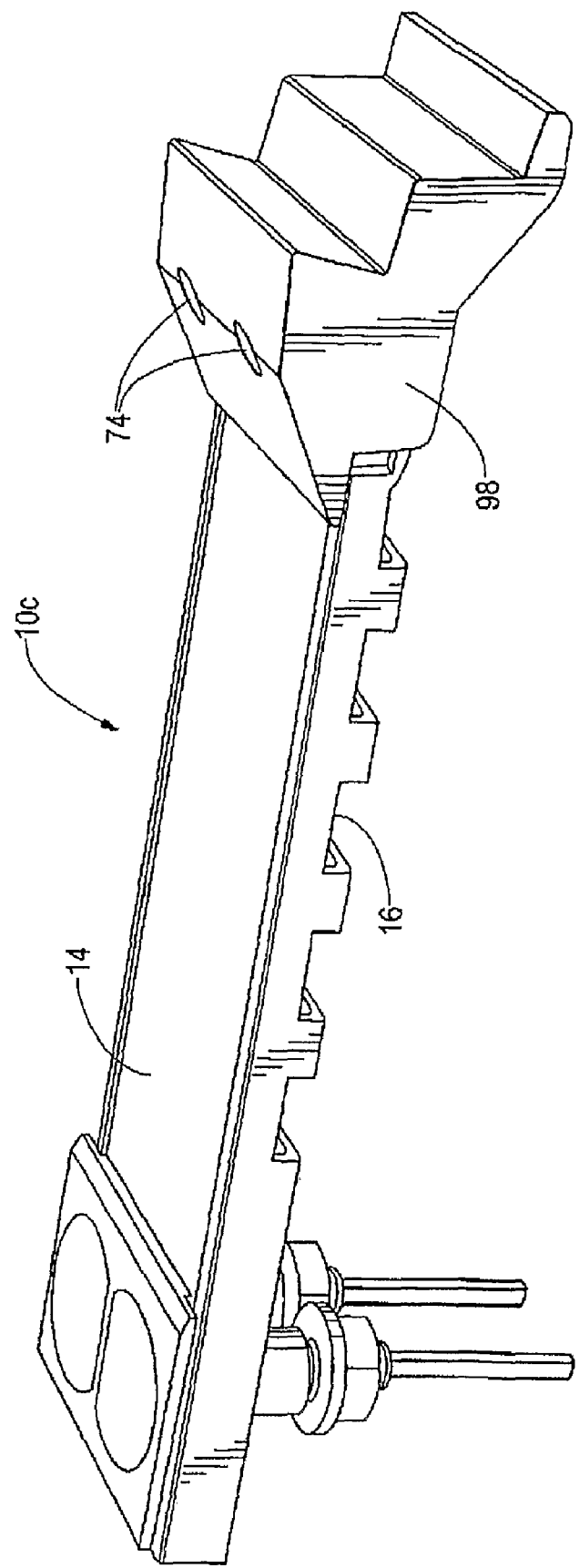
FIG. 19 is a view similar to FIG. 12 but shows substitution of a different type of means for engaging.

Turning now to the embodiment in FIG. 19, means for engaging 78 has been replaced by clip 98 with a reverse overhang.

Figure 20:
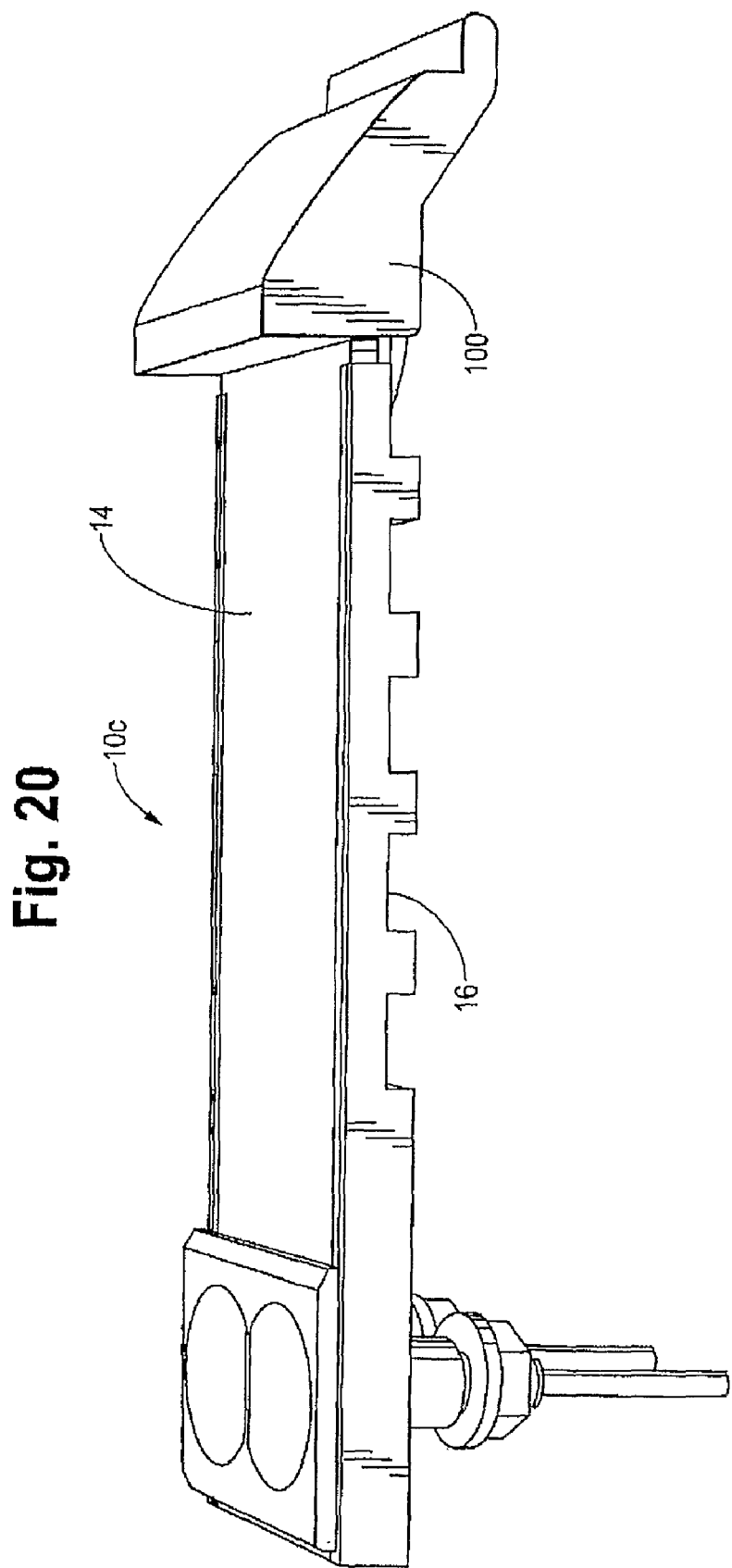
FIG. 20 is a view similar to that in FIG. 12 but shows substitution of a further type of means for engaging.

Similarly, in FIG. 20, clip 78 of the third embodiment has been replaced by a 3.0 mm clip 100 instead of the 5.0 mm clip 78 of the third embodiment.

Figure 21:
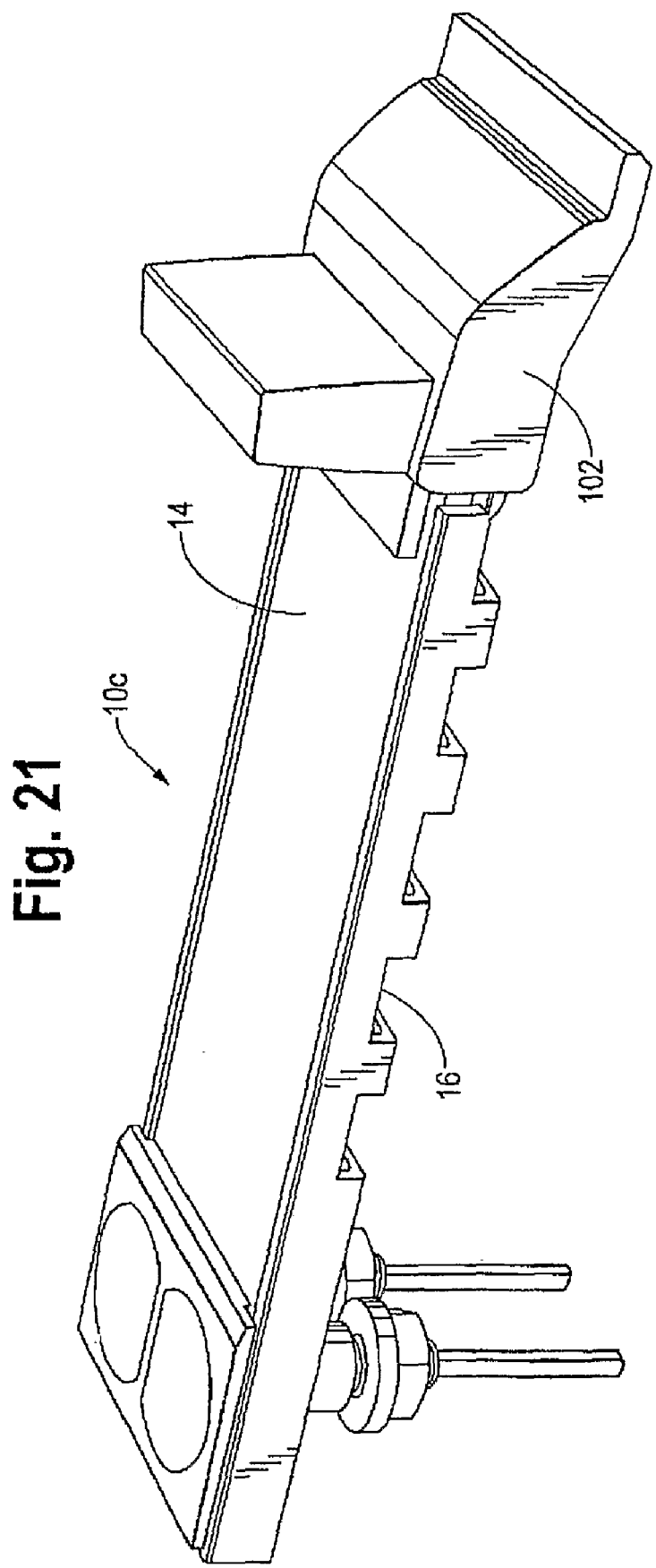
FIG. 21 is a view similar to that in FIG. 12 but shows yet a further form of means for engaging.

In FIG. 21, clip 78 has been replaced by a 2.4 mm forward clip 102.

It will be appreciated by one skilled in the art that each of clips 98, 100 and 102 is in modular form and can be readily exchanged for clip 78, being fastened to fastener 10c by spindle screws 80.

Figure 22:
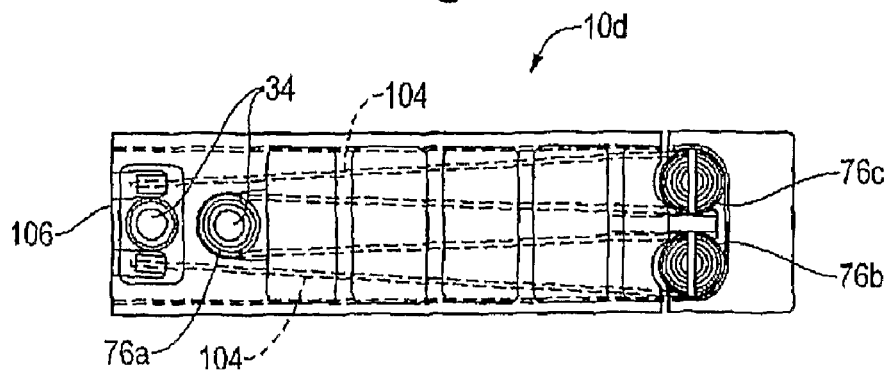
FIG. 22 is a plan view from below of a fourth embodiment of the invention showing a different configuration of shape memory alloy wire compared to the third embodiment.

Turning now to FIG. 22, fastener 10d has, instead of SMA profile 12 as in the first and second embodiments, or U-shaped SMA wire 82, SMA wire 104 which is almost twice as long as that in the third embodiment. In the fourth embodiment, SMA wire 104 winds around first spindle 76a, second spindle 76b and third spindle 76c before returning to base 106 of fastener 10d. To accommodate spindle 76b, contact pins 34 are arranged one on top of the other rather than side by side as in the previous embodiments. In this embodiment, SMA wire 104 may provide 80N pulldown using 0.015 inch SMA wire.

Figure 23:
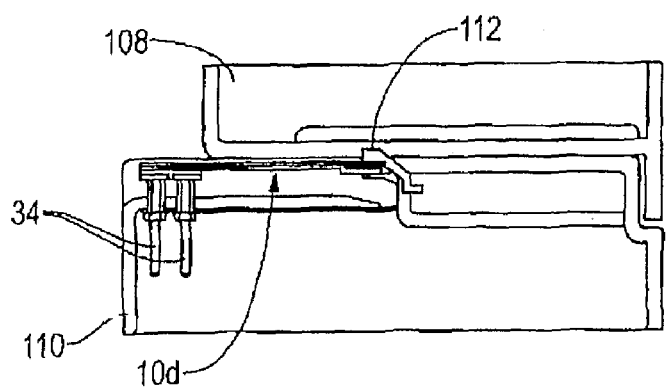
FIG. 23 shows in side elevation the fourth embodiment in situ in the engaged position.
Figure 24:
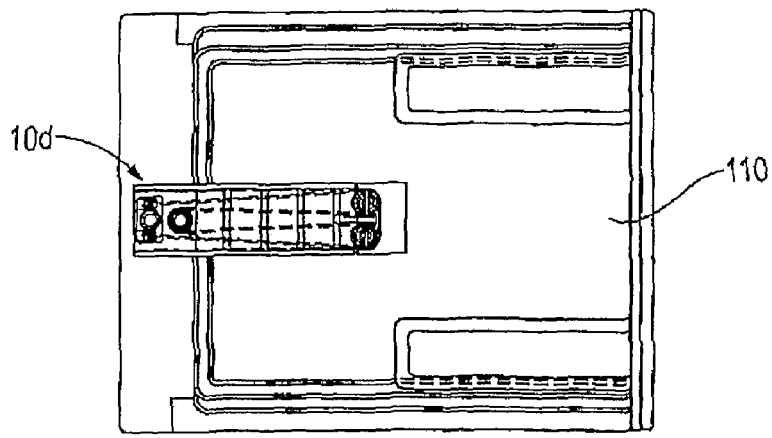
FIG. 24 is a view from below of the fastener in FIGS. 22 and 23, in situ.

Fastener 10d is shown in situ in FIGS. 23 and 24, in which some components are shown in dotted outline. As can be seen in FIG. 23, fastener 10d engages element 108 to element 110, to which fastener 10d is fixed. When fastener 10d is activated by heating SMA wire 104, overhang 112 is drawn out of engagement with element 108, freeing element 108 from element 110. Element 110 may be, for example, an instrument on an instrument panel or a radio or CD player in a vehicle, with element 108 representing a frame or mount. As can be seen, fastener 10*d* is hidden from view in the engagement position.

Turning now to the fifth embodiment in FIG. 25, this is similar to the previous four embodiments except that fastener 10*e* includes an overtemperature failsafe mechanism. Fastener 10*e* is shown with the mounting pins 34 one on top of the other, as in the fourth embodiment, rather than side by side, but the principle could be applied to any of the embodiments described herein.

In some environments, ambient temperature may become relatively high, for example, in a closed vehicle standing in the sun in summer. In such a circumstance, it may be desirable to ensure that the fastener of the invention is not inadvertently disengaged. In this embodiment, the fastener of the invention includes a second actuating means 114, secured to the assembly by a second flexible core 116. In the embodiment shown, second actuating means 114 takes the form of an SMA wire with a lower "pulling" power than that of actuating means 82. Otherwise, the configuration of second flexible core 116 and second actuating means 114 may be adapted from any of those previously described.

In this embodiment, once the temperature of second actuating means 114 reaches (in this example) 70° Celsius, second actuating means 114 contracts, locking fastener 10*e* into the locked position shown. To disengage fastener 10*e*, first actuating means 82 is heated to a (higher) desired temperature and, because of its superior pulling power, first actuating means 82 can contract to draw means for engaging 18 out of contact with an element (not shown), to disengage from that element, at the same time overcoming the pulling power of second actuating means 114.

INDUSTRIAL APPLICABILITY

As will be readily appreciated by those skilled in the various arts, the invention disclosed herein is not limited to the examples set out and has wide application in many areas. The invention represents a significant advance in the art of securing and releasing, particularly in relation to beam-type fasteners

The invention claimed is:
1. A fastener including:
 a. actuating means including a material adapted to contract when activated;
 b. bias means; and
 c. a flexible core located between the actuating means and the bias means, the flexible core have a means for engaging;
 wherein the means for engaging is moveable upon contraction of the material, between an engagement position and a disengagement position, and wherein the bias means biases the flexible core to the engagement position.
2. The fastener of claim 1, wherein the flexible core is adapted to substantially insulate the actuating means from the bias means.
3. The fastener of claim 1, wherein the flexible core is made of a plastic material.
4. The fastener of claim 1, wherein the bias means is a steel leaf spring.
5. The fastener of claim 1, wherein the actuating means is a punched shape memory alloy profile.
6. The fastener of claim 1, wherein the actuating means includes one or more strands or wires of shape memory alloy.
7. The fastener of any one of claims 1 to 6, wherein the means for engaging is a projecting wedge, a peg and/or groove.
8. The fastener of claim 1, wherein the means for engaging is separate from the flexible core.
9. The fastener of claim 1, wherein the fastener is adapted to indicate whether the means for engaging is in the engagement or disengagement position.
10. The fastener of claim 1, which includes a second actuating means adapted to contract when activated at a different temperature from that of the first actuating means.

* * * * *